US008528613B2

United States Patent
Isobe

(10) Patent No.: US 8,528,613 B2
(45) Date of Patent: Sep. 10, 2013

(54) PNEUMATIC TIRE

(75) Inventor: Satoru Isobe, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 525 days.

(21) Appl. No.: 12/451,967

(22) PCT Filed: May 12, 2008

(86) PCT No.: PCT/JP2008/058707
§ 371 (c)(1),
(2), (4) Date: Dec. 9, 2009

(87) PCT Pub. No.: WO2009/037891
PCT Pub. Date: Mar. 26, 2009

(65) Prior Publication Data
US 2010/0116402 A1 May 13, 2010

(30) Foreign Application Priority Data
Sep. 20, 2007 (JP) ................................. 2007-244146

(51) Int. Cl.
B60C 9/22 (2006.01)
B60C 9/28 (2006.01)

(52) U.S. Cl.
USPC ............ 152/538; 152/526; 152/531; 152/454

(58) Field of Classification Search
USPC .......................... 152/531, 454, 526, 532, 538
IPC ............................... B60C 9/22, 9/18, 9/20, 9/28
See application file for complete search history.

(56) References Cited

U.S. PATENT DOCUMENTS

| 5,353,856 A * | 10/1994 | Kishi et al. ............... 152/209.14 |
| 5,738,740 A | 4/1998 | Cluzel |
| 6,367,527 B1 | 4/2002 | Cluzel |
| 7,575,031 B2 | 8/2009 | Manno et al. |
| 2006/0169381 A1* | 8/2006 | Radulescu et al. ............ 152/531 |
| 2008/0156410 A1* | 7/2008 | Isobe ............................ 152/531 |
| 2009/0277557 A1* | 11/2009 | Suzuki et al. ................. 152/532 |

FOREIGN PATENT DOCUMENTS

| DE | 693 01 302 T2 | 5/1996 |
| EP | 1 787 825 A1 | 5/2007 |
| JP | 63-151504 | 6/1988 |
| JP | 04-183608 | 6/1992 |
| JP | 6-199105 A | 7/1994 |

(Continued)

Primary Examiner — Justin Fischer
Assistant Examiner — Philip N Schwartz
(74) Attorney, Agent, or Firm — Carrier Blackman & Associates, P.C.; Joseph P. Carrier; William D. Blackman

(57) ABSTRACT

A pneumatic tire includes two cross belts having codes forming 5 to 30 degrees to a tire circumferential direction; a circumferential reinforcing layer having a width smaller than the cross belts, and having codes forming 0 to 5 degrees to the tire circumferential direction; and a carcass located inside, in a tire diameter direction, relative to a cross belt being inside among the cross belts. At 100% internal inflation pressure, a distance X1 between an equatorial plane and an outer edge of the circumferential reinforcing layer is 60% to 75% of a distance W between the equatorial plane and an outermost section of the carcass, and at 5% internal inflation pressure, a distance Y between the equatorial plane and a separation section of the carcass and a belt outwardly adjoining the carcass is 95% to 105% of a distance X2 between the equatorial plane and the outer edge.

8 Claims, 5 Drawing Sheets

(56) References Cited

FOREIGN PATENT DOCUMENTS

| | | |
|---|---|---|
| JP | 08-108709 | 4/1996 |
| JP | 11-502166 | 2/1999 |
| JP | 2000-264014 | 9/2000 |
| JP | 2001-191723 | 7/2001 |
| JP | 2001-512390 | 8/2001 |
| JP | 2005-145429 | 6/2005 |
| JP | 2007-106152 | 4/2007 |
| JP | 2008-1264 | 1/2008 |
| JP | 2008-105656 | 5/2008 |
| WO | WO 96/20095 | 7/1996 |
| WO | WO 2007/043445 A1 | 4/2007 |
| WO | WO2007043445 * | 4/2007 |
| WO | WO 2007/148447 A1 | 12/2007 |
| WO | WO2007148447 * | 12/2007 |

* cited by examiner

PNEUMATIC TIRE

TECHNICAL FIELD

The present invention relates to a pneumatic tire. The invention particularly relates to a pneumatic tire used for trucks and buses and having a large width and a low aspect ratio.

BACKGROUND ART

Among pneumatic tires, single tires used for trucks and buses have been developed to have a low aspect ratio and a large width in recent years. To improve the durability of such pneumatic tires and to prevent biased wear thereof, such a configuration has been adopted that includes a circumferential reinforcing layer that includes codes having a small angle with respect to a circumferential direction of the pneumatic tires.

Pneumatic tires including a circumferential reinforcing layer have been demanded to reduce the fatigue of wires at outer edges, in a tire width direction, of the circumferential reinforcing layer, and to prevent the diameter growth of outermost circumferential grooves in the tire width direction. For example, Patent Document 1 discloses a technology for increasing the number of wires to be provided in portions outer than the circumferential reinforcing layer in the tire width direction.

[Patent Document 1] Japanese Patent Application Laid-open (Translation of PCT Application) No. 2001-512390

DISCLOSURE OF INVENTION

Problem to be Solved by the Invention

The technology disclosed in Patent Document 1, however, poses problems of making complex the method for manufacturing a pneumatic tire and of requiring manufacturing cost. Thus, there have been demands to reduce the fatigue of wires easily and to make uniform wear in the tread. The present invention is made in view of the foregoing, and has an object to achieve at least one of reducing the fatigue of wires with a simple structure and making uniform wear with a simple structure.

Means for Solving Problem

A pneumatic tire according to an aspect of the present invention includes at least two cross belts that have codes forming an angle of 5 degrees or greater and 30 degrees or less with respect to a tire circumferential direction; a circumferential reinforcing layer that has a width smaller than smallest width of the cross belts, and that has codes forming an angle of 0 degrees or greater and 5 degrees or less with respect to the tire circumferential direction; and a carcass located inside, in a tire diameter direction, relative to a cross belt being inside in the tire diameter direction. At 100% internal inflation pressure, a distance X1 between an equatorial plane of the pneumatic tire and an outer edge, in a tire width direction, of the circumferential reinforcing layer is not less than 60% and not more than 75% of a distance W between the equatorial plane and an outermost section of the carcass in the tire width direction, and at 5% internal inflation pressure, a distance Y between the equatorial plane and a separation section of the carcass and a belt outwardly adjoining the carcass in the tire diameter direction is not less than 95% and not more than 105% of a distance X2 between the equatorial plane and the outer edge, in the tire width direction, of the circumferential reinforcing layer.

With the above arrangement, the separation section having a smaller diameter growth than the other parts is provided near outer edges of the circumferential reinforcing layer in the tire width direction. This prevents the diameter growth at the outer edges of the circumferential reinforcing layer in the tire width direction. Accordingly, it is possible to prevent the fatigue of codes at the outer edges of the circumferential reinforcing layer in the tire width direction.

In the pneumatic tire, at 5% internal inflation pressure, a distance Z between the equatorial plane and a bottom of a circumferential groove provided in an outermost portion of the pneumatic tire in the tire width direction is preferably not less than 95% and not more than 105% of the distance Y between the equatorial plane and the separation section.

With the above arrangement, the separation section having a smaller diameter growth than the other parts is provided near the outer edges of the circumferential reinforcing layer in the tire width direction. This prevents the fatigue of the codes at the outer edges of the circumferential reinforcing layer in the tire width direction. This also prevents the diameter growth of the outermost circumferential grooves, in the tire width direction, of the pneumatic tire, thus preventing biased wear in shoulder portions of the pneumatic tire. Accordingly, it is possible to prevent the fatigue of the codes at the outer edges of the circumferential reinforcing layer in the tire width direction, and to make uniform wear in the tread.

As shown in FIG. 5, codes 5Ap of the first cross belt 5A and codes 5Bp of the second cross belt 5B, which constitute the cross belt 5 provided in the pneumatic tire 1 according to the present embodiment, are inclined with respect to the tire circumferential direction, i.e., the direction along which the tire center line CL extends. Specifically, the codes of the cross belt 5 provided in the pneumatic tire 1 according to the present embodiment intersect the tire circumferential direction. Provided that the codes 5Ap of the first cross belt 5A form an angle θ2 with the tire circumferential direction and the codes 5Bp of the second cross belt 5B form an angle θ4 with the tire circumferential direction, θ2 and θ4 are both 5 degrees or greater and 30 degrees or less in the present embodiment. The first cross belt 5A and the second cross belt 5B constitute the cross belt 5 in the present embodiment. Specifically, the cross belt 5 includes two plies of the cross belts in the present embodiment. However, the cross belts are not limited to two plies.

In the pneumatic tire, when Qd is a distance between a rotation axis of the pneumatic tire and a position Q at which a perpendicular line extending from an outer edge, in the tire width direction, of the cross belt being inside in the tire diameter direction intersects the carcass, and when Pd is a distance between the separation section and the rotation axis, a difference between Pd and Qd is preferably not less than 5% and not more than 7% of a product E of a nominal width of the pneumatic tire and a nominal aspect ratio of the pneumatic tire. And when Sd is a distance between the rotation axis of the pneumatic tire and a position S at which a perpendicular line extending from a midpoint R intersects the carcass, the midpoint R being on the cross belt being inside in the tire diameter direction and between the separation section and the outer edge, in the tire width direction, of the cross belt being inside in the tire diameter direction, a difference between Pd and Sd is preferably not less than 2% and not more than 4% of the product E of the nominal width of the pneumatic tire and the nominal aspect ratio of the pneumatic tire.

In the pneumatic tire, in a cross section of the pneumatic tire taken along a meridional plane passing the rotation axis, or at 5% internal inflation pressure, a perpendicular distance C from an outer edge, in the tire width direction, of the cross belt being inside in the tire diameter direction to the carcass is preferably not less than 3% and not more than 4.5% of the product E of the nominal width of the pneumatic tire and the nominal aspect ratio of the pneumatic tire. And a perpendicular distance D from a midpoint R to the carcass is preferably not less than 1.3% and not more than 2.3% of the product E of the nominal width of the pneumatic tire and the nominal aspect ratio of the pneumatic tire. The midpoint R is on the cross belt being inside in the tire diameter direction and between the separation section and the outer edge, in the tire width direction, of the cross belt being inside in the tire diameter direction.

The above pneumatic tire preferably includes at least one high-angle belt between the carcass and the cross belt being inside in the tire diameter direction. The high-angle belt has codes that form an angle of 45 degrees or greater and 90 degrees or less with respect to the tire circumferential direction.

In the pneumatic tire, at 100% internal inflation pressure, a distance L between the equatorial plane and an outer edge, in the tire width direction, of the high-angle belt is preferably not less than 75% and not more than 85% of the distance W between the equatorial plane and the outermost section of the carcass in the tire width direction. A distance M between the equatorial plane and an outer edge, in the tire width direction, of the cross belt being inside in the tire diameter direction is preferably not less than 85% and not more than 95% of the distance W between the equatorial plane and the outermost section of the carcass in the tire width direction. And a distance N between the equatorial plane and an outer edge, in the tire width direction, of a cross belt being outside in the tire diameter direction is preferably not less than 80% and not more than 90% of the distance W between the equatorial plane and the outermost section of the carcass in the tire width direction.

In the pneumatic tire, the nominal width of the pneumatic tire is preferably equal to or greater than 300 mm.

In the pneumatic tire, the nominal aspect ratio of the pneumatic tire is preferably equal to or less than 70%.

Effect of the Invention

According to the present invention, it is possible to achieve at least one of reducing the fatigue of wires with a simple structure and making uniform wear with a simple structure.

| EXPLANATIONS OF LETTERS OR NUMERALS | |
|---|---|
| 1 | pneumatic tire |
| 2 | bead core |
| 3 | carcass |
| 4 | high-angle belt |
| 4p | code |
| 4e | edge |
| 5 | cross belt |
| 5A | first cross belt |
| 5B | second cross belt |
| 5Ap, 5Bp | code |
| 5Ae, 5Be | edge |
| 6 | circumferential reinforcing layer |
| 6e | edge |
| 6p | code |
| 7 | protection belt |
| 8E | outermost main groove |
| 8EB | bottom |
| 9 | tread |

BEST MODE(S) FOR CARRYING OUT THE INVENTION

The present invention is described with reference to the accompanying drawings. The present invention is not limited to the best mode(s) for carrying out the invention (hereinafter, "embodiments"). Constituting elements in the following embodiments and examples include elements easily achieved by a person skilled in the art, elements being substantially the same as the constituting elements, and elements within the scope of equivalents of the constituting elements. The present invention is preferably applied to tires for trucks and buses (TB tires), and is particularly preferable for pneumatic tires having a low aspect ratio and a large width.

A pneumatic tire according to the present embodiment has a feature that a separation section of a carcass and a belt adjoining the carcass, i.e., a curvature point of the carcass in a meridional cross section of the pneumatic tire, is provided near outer edges, in the tire width direction, of a circumferential reinforcing layer. The circumferential reinforcing layer includes codes forming an angle of 5 degrees or greater and 30 degrees or less with respect to a tire circumferential direction. As a preferable mode of the present embodiment, outermost circumferential grooves (hereinafter, "main grooves") in the tire width direction are arranged near the separation section of the carcass and the belt adjoining the carcass. The following describes a structure of a pneumatic tire according to the present embodiment.

Figure 1:
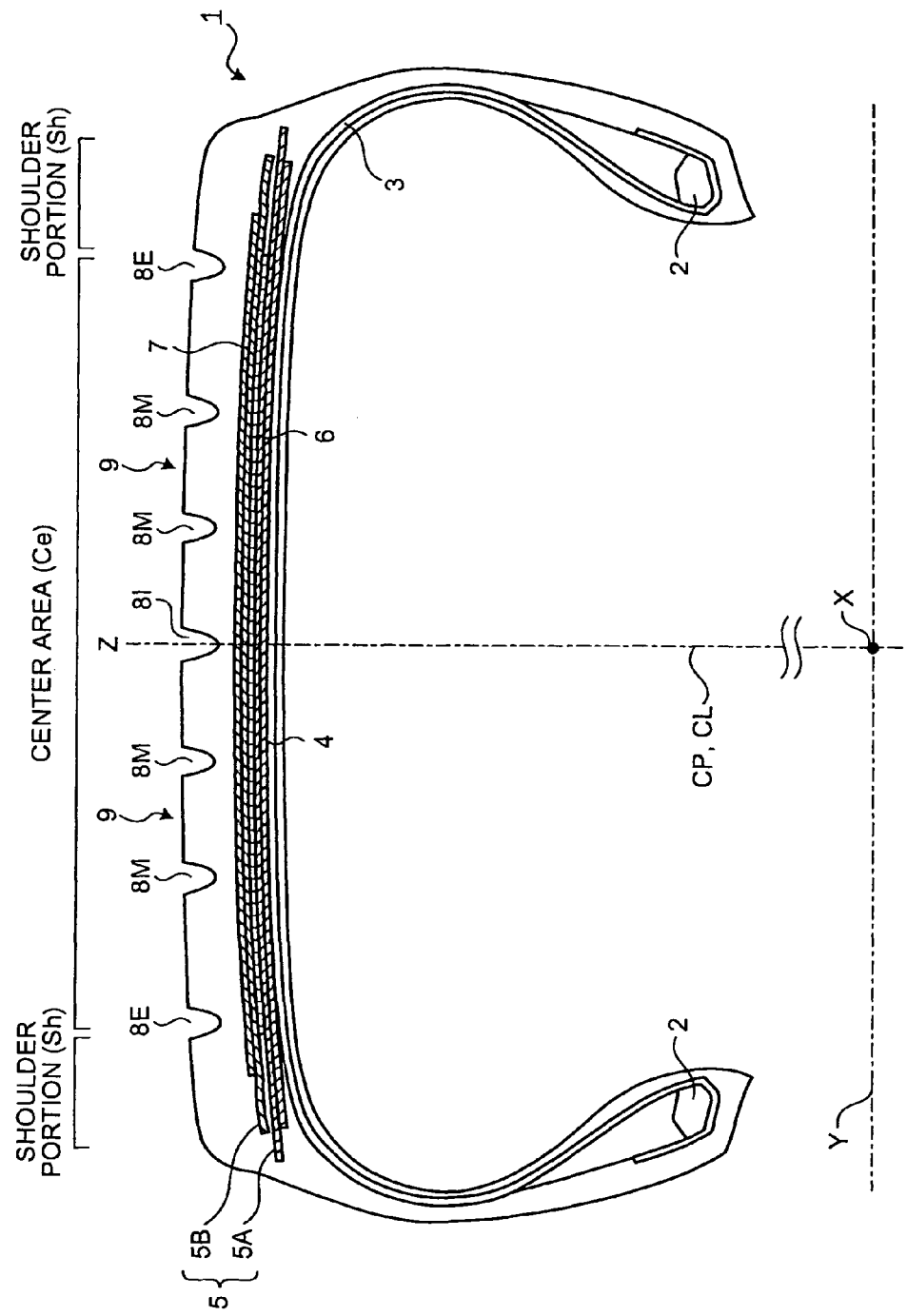
FIG. 1 is a meridional cross section depicting a cross section taken along a meridional plane, including a rotation axis, of a pneumatic tire according to the present embodiment.
Figure 2:
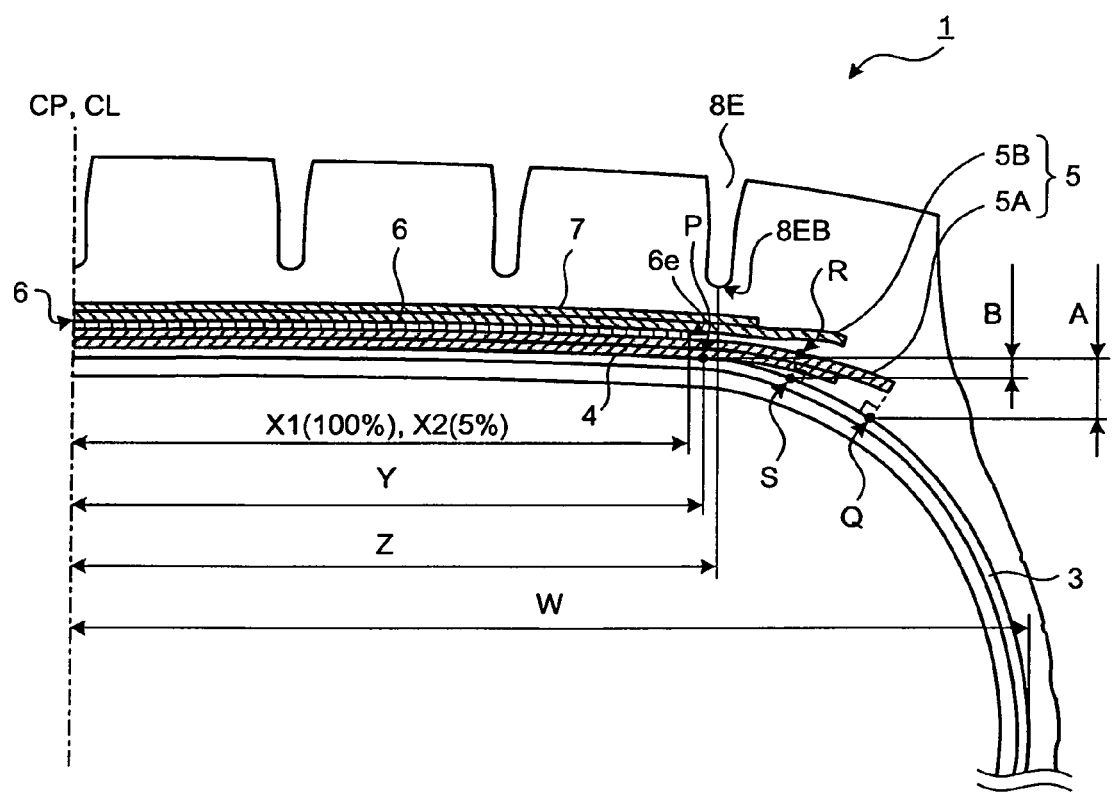
FIG. 2 is a schematic view for explaining a dimension of each component in a meridional cross section of the pneumatic tire according to the present embodiment.
Figure 3:
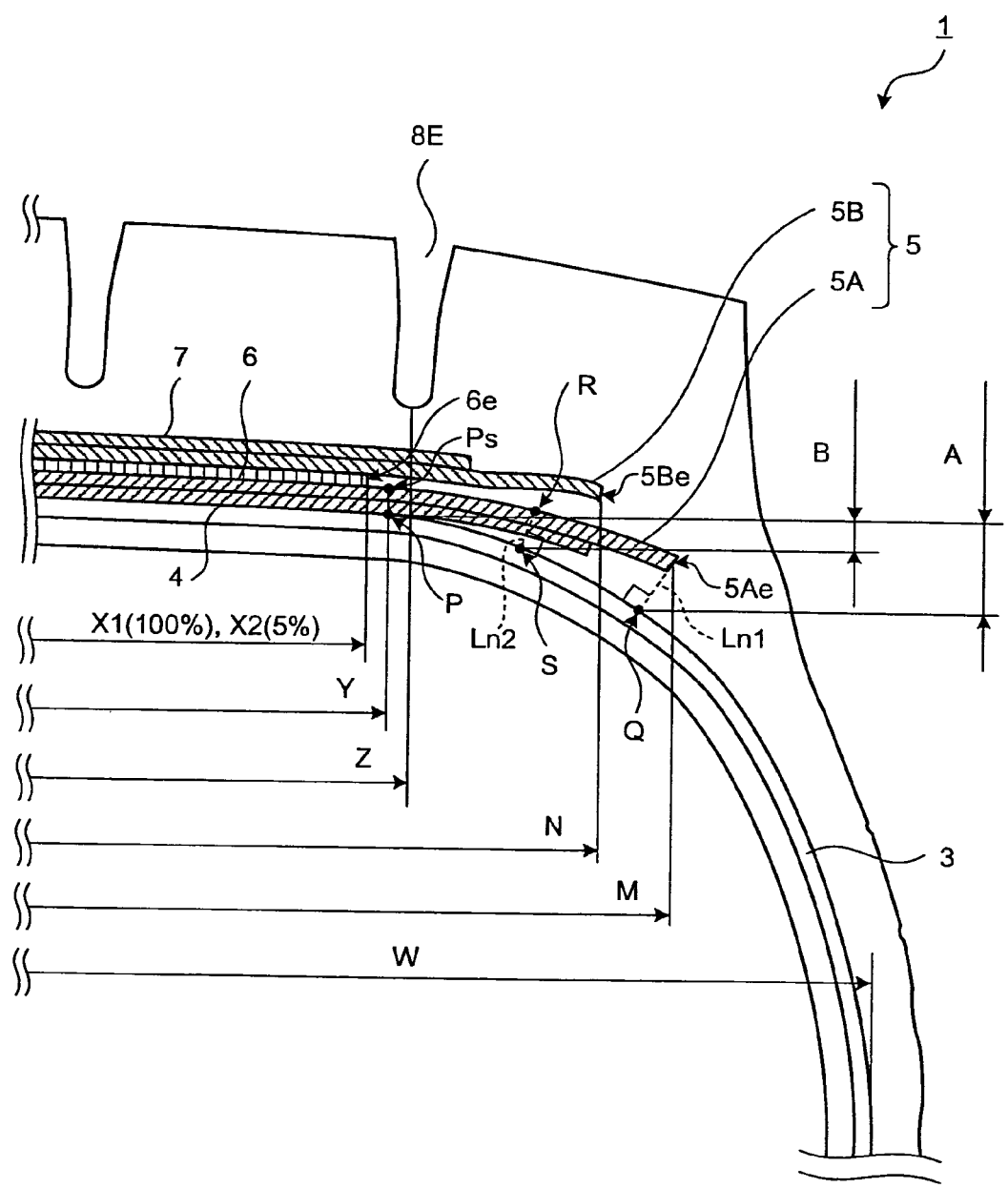
FIG. 3 is an enlarged view of a shoulder area of the pneumatic tire, shown in FIG. 2, according to the present embodiment.
Figure 4:
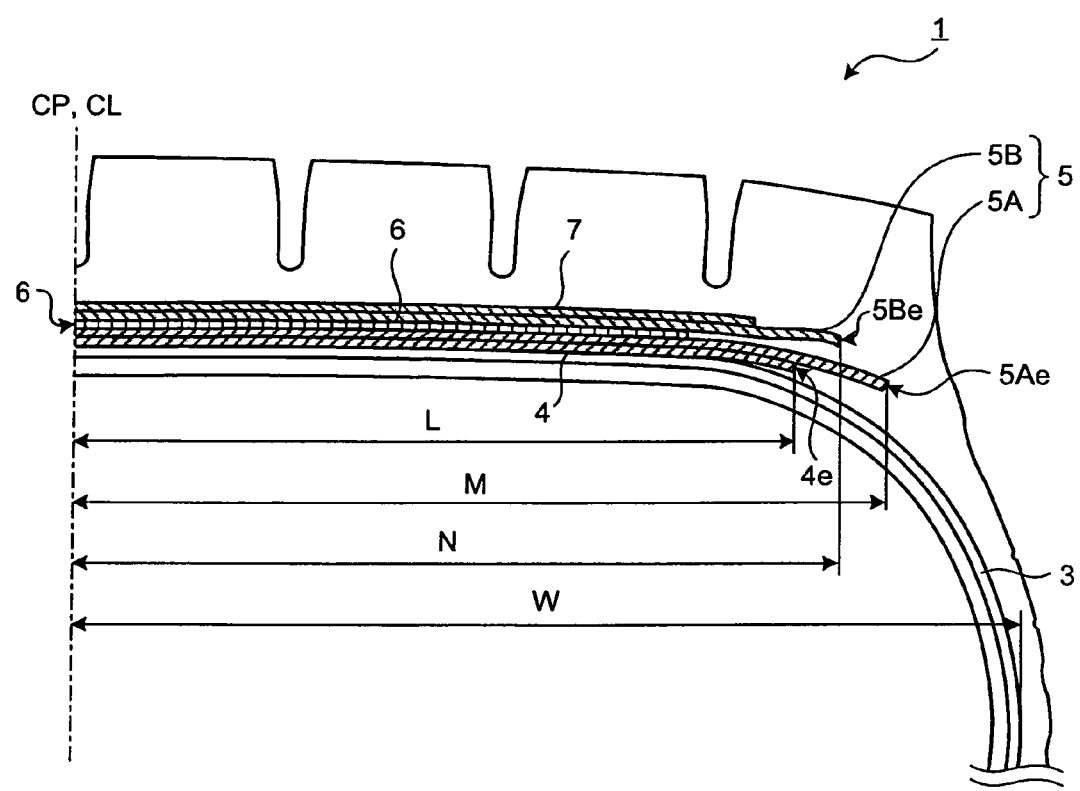
FIG. 4 is a schematic view for explaining a dimension of each component in a meridional cross section of the pneumatic tire according to the present embodiment.
Figure 5:
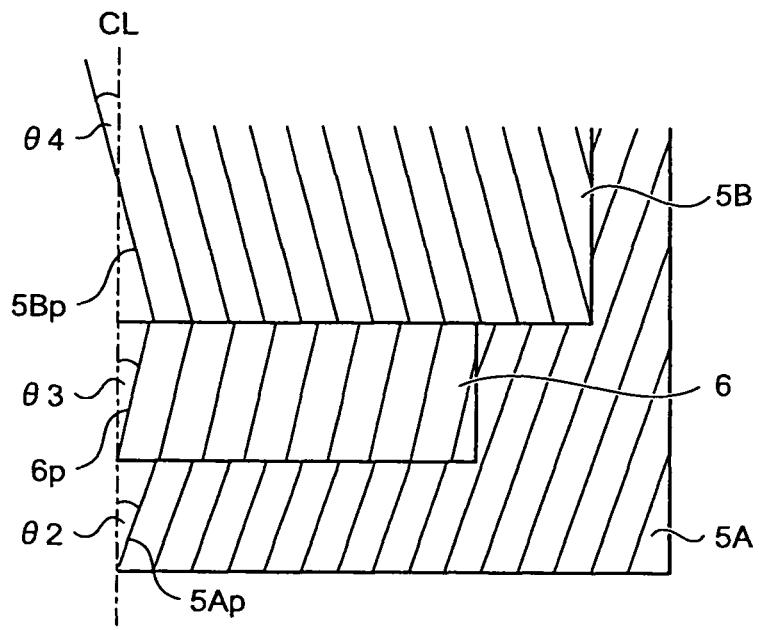
FIG. 5 is a plan view of cross belts and a circumferential reinforcing layer that are provided in the pneumatic tire according to the present embodiment.
Figure 6:
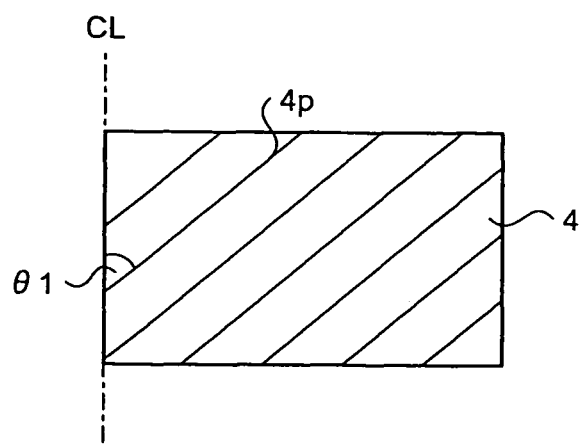
FIG. 6 is a plan view of a high-angle belt provided in the pneumatic tire according to the present embodiment.

FIG. 1 is a meridional cross section depicting a cross section taken along a meridional plane, including a rotation axis, of the pneumatic tire according to the present embodiment. FIG. 2 is a schematic view for explaining a dimension of each component in a meridional cross section of the pneumatic tire according to the present embodiment. FIG. 3 is an enlarged view of a shoulder area of the pneumatic tire, shown in FIG. 2, according to the present embodiment. FIG. 4 is a schematic view for explaining a dimension of each component in a meridional cross section of the pneumatic tire according to the present embodiment. FIG. 5 is a plan view of cross belts and a circumferential reinforcing layer that are provided in the pneumatic tire according to the present embodiment. FIG. 6 is a plan view of a high-angle belt provided in the pneumatic tire according to the present embodiment.

In FIG. 1, Y axis is a rotation axis of a pneumatic tire 1. X axis is an axis orthogonal to the Y axis, and parallel to a direction in which the pneumatic tire 1 advances with rolling motion. Z axis is an axis orthogonal to the X axis and the Y axis, and also orthogonal to a road surface where the pneumatic tire 1 makes contact with the ground. A circumferential direction of the pneumatic tire 1 (hereinafter, "tire circumferential direction") is a direction in which the pneumatic tire 1 rotates about the rotation axis (the Y axis), and in which a cross line between an equatorial plane CP of the pneumatic tire 1 and a surface of a tread 9 of the pneumatic tire 1 extends, i.e., a direction in which a line parallel to a center line CL of the pneumatic tire 1 (hereinafter, "tire center line") extends. The tire center line CL corresponds to an equator line of the pneumatic tire 1. Specifically, the tire center line CL is a cross line between a plane passing the center in the width direction and being orthogonal to the rotation axis (the Y axis) of the pneumatic tire 1, and the surface of the tread 9 of the pneumatic tire 1.

The equatorial plane CP of the pneumatic tire 1 is a plane being orthogonal to the rotation axis (the Y axis) of the pneumatic tire 1, and passing the center in a direction parallel to the rotation axis (the Y axis) of the pneumatic tire 1, i.e., in a width direction of the pneumatic tire 1 (hereinafter, "tire width direction"). A diameter direction of the pneumatic tire 1 (hereinafter, "tire diameter direction") is a direction passing the rotation axis (the Y axis) of the pneumatic tire 1 and being parallel to the X axis or the [[Y]] Z axis. The outer side in the tire diameter direction is the side where the tread 9 of the pneumatic tire 1 is located, and the inner side in the tire diameter direction is the side where the rotation axis (the Y axis) of the tire 1 is located.

As shown in FIG. 1, the pneumatic tire 1 according to the present embodiment includes bead cores 2, and, sequentially from the inner side in the tire diameter direction, a carcass 3, a high-angle belt 4, a cross belt 5 including a first cross belt 5A and a second cross belt 5B, a circumferential reinforcing layer 6, and a protection belt 7. The high-angle belt 4, the cross belts 5 including the first cross belt 5A and the second cross belt 5B, the circumferential reinforcing layer 6, and the protection belt 7 are collectively referred to as a belt layer. For codes constituting the belt layer are used metal wires, for example. On the outer periphery of the belt layer in the tire diameter direction is provided tread rubber constituting the tread 9, and on the outer sides of the carcass 3 in the tire width direction is provided side wall rubber constituting side wall portions.

The bead cores 2 are constituted as a pair at the left and the right of the pneumatic tire 1. The carcass 3 is toroidally extended between the bead cores 2, the left and the right. The high-angle belt 4 is provided on the outer side of the carcass 3 in the tire diameter direction, so as to adjoin the carcass 3. On the outer side of the high-angle belt 4 in the tire diameter direction, belts are provided in the order of the first cross belt 5A, the circumferential reinforcing layer 6, and the second cross belt 5B, from the inner side toward the outer side in the tire diameter direction. On the inner outer side of the second cross belt 5B in the tire diameter direction is provided the protection belt 7 that protects the first cross belt 5A, the circumferential reinforcing layer 6, the second cross belt 5B, and the like from damage.

As shown in FIG. 1, the tread 9 of the pneumatic tire 1, provided in a road contact portion of the pneumatic tire 1, is a rubber layer covering the outer side of the carcass 3 and of the belt layer. The carcass 3 is folded back at the bead cores 2, and rolled around the bead cores 2. In spaces created by the carcass 3 rolled around the bead cores 2 is provided rubber called bead filler.

In the ground-contact surface of the tread 9, i.e., a tread surface, are provided circumferential grooves extending toward the tire circumferential direction, i.e., main grooves 8I, 8M, and 8E. The pneumatic tire 1 according to the present embodiment includes seven circumferential main grooves. The tread 9 is segmented by the seven main grooves, so that its land section is formed. Among the seven main grooves, a main groove provided in a center portion (hereinafter, "center area") Ce in the tire width direction of the pneumatic tire 1 is referred to as a center-portion main groove 8I, and main grooves provided in outermost portions in the tire width direction are referred to as outermost main grooves 8E. In the pneumatic tire 1 according to the present embodiment, a portion on the inner side delimited by the outermost main grooves 8E and close to the tire center line CL is the center area Ce, and portions outer than the outermost main grooves 8E in the tire width direction are shoulder portions Sh. In the tire width direction, main grooves between the center-portion main groove 8I and the outermost main grooves 8E are middle main grooves 8M. In the present embodiment, the number of the main grooves is not limited to seven.

As shown in FIG. 5, codes 5Ap of the first cross belt 5A and codes 5Bp of the second cross belt 5B, which constitute the cross belt 5 provided in the pneumatic tire 1 according to the present embodiment, are inclined with respect to the tire circumferential direction, i.e., the direction along which the tire center line CL extends. Specifically, the codes of the cross belt 5 provided in the pneumatic tire 1 according to the present embodiment intersect the tire circumferential direction. Provided that the codes 5Ap of the first cross belt 5A form an angle $\theta 2$ with the tire circumferential direction and the codes 5Bp of the second cross belt 5B form an angle $\theta 4$ with the tire circumferential direction, $\theta 2$ and $\theta 4$ are both 5 degrees or greater and 30 degrees or less in the present embodiment. The first cross belt 5A and the second cross belt 5B constitute the cross belt 5 in the present embodiment. Specifically, the cross belt 5 include two plies of the cross belts in the present embodiment. However, the cross belts are not limited to two plies.

In the pneumatic tire 1 according to the present embodiment, the circumferential reinforcing layer 6 is provided between the first cross belt 5A and the second cross belt 5B. The circumferential reinforcing layer 6 is provided to improve the durability of the pneumatic tire 1 and to make uniform wear in the tread 9. Codes 6p of the circumferential reinforcing layer 6 form a predetermined angle $\theta 3$ (see FIG. 5) in the range of 0 degrees or greater and 5 degrees or less with respect to the tire circumferential direction, and is substantially parallel to the tire circumferential direction. Metal wires are used for the codes 6p of the circumferential reinforcing layer 6.

As described, codes 4p of the high-angle belt 4, provided on the outer side of the carcass 3 in the tire diameter direction to adjoin the carcass 3, are inclined with respect to the tire circumferential direction as shown in FIG. 6. Provided that the codes 4p of the high-angle belt 4 form an angle of $\theta 1$ with the tire circumferential direction, $\theta 1$ is 45 degrees or greater and 90 degrees or less in the present embodiment. As such, the codes 4p of the high-angle belt 4 form a greater angle with the tire circumferential direction, compared with the codes 5Ap and 5Bp of the cross belt 5 and the codes 6p of the circumferential reinforcing layer 6. Further, the codes 4p intersect the tire circumferential direction at nearly a right angle. In the present embodiment, the high-angle belt 4 does not always have to be provided. When no high-angle belt 4 is provided, the first cross belt 5A, located inside among the cross belt 5 in the tire diameter direction, serves as the belt provided on the outer side of the carcass 3 in the tire diameter direction and adjoining the carcass 3.

Referring to FIGS. 2 to 4, the following describes a dimension of each component in a meridional cross section of the pneumatic tire according to the present embodiment. As shown in FIG. 2, the pneumatic tire 1 according to the present embodiment is preferably arranged such that when internal inflation pressure is 100% of a normal internal pressure Pni for the pneumatic tire 1, a distance X1 between the equatorial plane CP of the pneumatic tire 1 and each of outer edges 6e, in the tire width direction, of the circumferential reinforcing layer 6 is not less than 60% and not more than 75% of a distance W between the equatorial plane CP and each outermost section, in the tire width direction, of the carcass 3. Specifically, X1 and W are set to satisfy the relation of $0.60 \leq X1/W \leq 0.75$. This improves the durability of the pneumatic tire 1, and to make uniform wear in the tread 9. The normal internal pressure Pni for the pneumatic tire 1 as used herein is "maximum air pressure" specified by the Japan automobile tyre manufactures association, Inc. (JATMA), a maximum value described in "TIRE LOAD LIMINTS AT VARIOUS COLD INFLATION PRESSURES" specified by the tire and rim association, Inc. (TRA), or "INFLATION PRESSURES" specified by the European tyre and rim technical organization (ETRTO) (the same applies to the following).

In the pneumatic tire 1 according to the present embodiment, near the outer edge 6e of the circumferential reinforcing layer 6 in the tire width direction is provided a curvature point of the carcass 3, i.e., a separation section (hereinafter, "carcass curvature point") P of the carcass 3 and a belt outwardly adjoining the carcass 3 in the tire diameter direction (the high-angle belt 4 in the present embodiment). To achieve this arrangement, in the present embodiment, when internal inflation pressure is 5% of the normal internal pressure Pni for the pneumatic tire 1, a distance Y between the equatorial plane CP and the carcass curvature point P is not less than 95% and not more than 105% of a distance X2 between the equatorial plane CP and the outer edge 6e of the circumferential reinforcing layer 6 in the tire width direction. Specifically, X2 and Y are set to satisfy the relation of $0.95 \leq Y/X2 \leq 1.05$. This prevents the diameter growth of the outer edge 6e, in the tire width direction, of the circumferential reinforcing layer 6, so as to prevent the fatigue of the codes 6p of the circumferential reinforcing layer 6.

A carcass line at the carcass curvature point P (the shape of the carcass 3 in the meridional cross section) has a smaller curvature compared with a carcass line at the other parts. When internal pressure is applied to the pneumatic tire 1, the carcass line becomes a shape closer to a circle in the meridional cross section of the pneumatic tire 1. In this case, the carcass curvature point P having a small curvature has a smaller diameter growth compared with the other parts. Thus, the outer edge 6e of the circumferential reinforcing layer 6 in the tire width direction is provided near the carcass curvature point P, so that the diameter growth is prevented at the outer edge 6e of the circumferential reinforcing layer 6 in the tire width direction.

Each of the main grooves (the outermost grooves) 8E in the outermost portions of the pneumatic tire 1 in the tire width direction is provided near the carcass curvature point P, so that the diameter growth is prevented in the outermost main grooves 8E. Because each outermost main groove 8E is provided near the carcass curvature point P, a distance Z between the equatorial plane CP and a bottom 8EB of the outermost main groove 8E is not less than 95% and not more than 105% of the distance Y between the equatorial plane CP and the carcass curvature point P, when internal inflation pressure is 5% of the normal internal pressure Pni for the pneumatic tire 1. Specifically, Y and Z are set to satisfy the relation of $0.95 \leq Z/Y \leq 1.05$. This prevents the diameter growth of the outermost main groove 8E, so as to prevent biased wear in the shoulder portions Sh. Thus, the tread 9 can be uniformly worn. The bottom 8EB of the outermost main groove BE defines the distance Z as a distance between its innermost portion in the tire diameter direction and the equatorial plane CP.

When a rubber composition provided between the carcass 3 and a belt adjoining the carcass 3 (the high-angle belt 4 in the present embodiment) is different from a rubber composition (e.g., belt cushion) provided between the carcass and outer edges, in the tire width direction, of the belt adjoining the carcass 3, the carcass curvature point P is at each edge of the rubber composition provided between the inner carcass in the tire width direction and the outer edges, in the tire width direction, of the belt adjoining the carcass 3. On the contrary, when the rubber composition provided between the carcass 3 and the belt adjoining the carcass 3 (the high-angle belt 4 in the present embodiment) is the same as the rubber composition (e.g., belt cushion) provided between the carcass and the outer edges, in the tire width direction, of the belt adjoining the carcass 3, the carcass curvature point P is near the outer edge 6e of the circumferential reinforcing layer 6 in the tire width direction, so that the gauge of the rubber composition provided between the carcass 3 and the belt adjoining the carcass 3 (the dimension in the tire diameter direction) varies +0.2 mm or more.

Assume that Qd is a distance between the rotation axis of the pneumatic tire 1 (hereinafter, "the Y axis") and a position Q at which a perpendicular line Ln1 (see FIG. 3) extending from an outer edge 5Ae, in the tire width direction, of an inner cross belt in the tire diameter direction (the first cross belt 5A in the present embodiment) intersects the carcass 3, and that Pd is a distance between the carcass curvature point P and the Y axis. In this case, a difference A between Pd and Qd is preferably not less than 5% and not more than 7% of the product (hereinafter, "nominal tire height") E of a nominal width of the pneumatic tire 1 and a nominal aspect ratio of the pneumatic tire 1. Specifically, $0.05 \leq A/E \leq 0.07$ is preferable.

Assume that a midpoint R is on the first cross belt 5A and between the carcass curvature point P and the outer edge 5Ae, in the tire width direction, of the inner cross belt in the tire diameter direction (the first cross belt 5A in the present embodiment), and that Sd is a distance between the Y axis and a position S at which a perpendicular line Ln2 (see FIG. 3) extending from the midpoint R intersects the carcass 3. In this case, a difference B between Pd and Sd is preferably not less than 2% and not more than 4% of the nominal tire height E. Specifically, $0.02 \leq B/E \leq 0.04$ is preferable.

This prevents the diameter growth of the outer edges 6e, in the tire width direction, of the circumferential reinforcing layer 6 and the diameter growth of the outermost main grooves 8E. By making A and B greater within the above ranges, the diameter growth of the outermost main grooves 8E is efficiently prevented, so that the biased wear is efficiently prevented in the shoulder portions Sh of the pneumatic tire 1. The perpendicular line Ln1 is a linear line passing the edge 5Ae and being orthogonal to the tangent line of the carcass 3, and the Ln2 is a linear line passing the midpoint R and being orthogonal to the tangent line of the carcass 3.

In a cross section of the pneumatic tire 1 as a single piece taken along a meridional plane passing the Y axis, or at 5% internal inflation pressure, assume that C is a perpendicular distance from the outer edge 5Ae, in the tire width direction, of the inner cross belt in the tire diameter direction (the first cross belt 5A in the present embodiment) to the carcass 3, and that D is a perpendicular distance from the midpoint R, provided on the first cross belt 5A and between the carcass curvature point P and the outer edge 5Ae, in the tire width direction, of the first cross belt 5A to the carcass 3. In this case, C is preferably not less than 3% and not more than 4.5% of the nominal tire height E, and D is preferably not less than 1.3% and not more than 2.3% of the nominal tire height E. Specifically, $0.03 \leq C/E \leq 0.045$ and $0.013 \leq D/E \leq 0.023$ are preferable. This further improves the durability of the pneumatic tire 1.

As shown in FIG. 4, assume that, when internal inflation pressure is 100% of the normal internal pressure Pni for the pneumatic tire 1, L is a distance between the equatorial plane CP and an outer edge 4e, in the tire width direction, of the high-angle belt 4. Further, assume that M is a distance between the equatorial plane CP and the outer edge 5Ae, in the tire width direction, of the inner cross belt in the tire diameter direction (the first cross belt 5A in the present embodiment), and that N is a distance between the equatorial plane CP and an outer edge 5Be, in the tire width direction, of an outer cross belt in the tire diameter direction (the second cross belt 5B in the present embodiment). In this case, preferably, L is not less than 75% and not more than 85% of the distance W between the equatorial plane CP and the outermost section of the carcass 3 in the tire width direction, M is not less than 85% and not more than 95% of the distance W between the equatorial plane CP and the outermost section of the carcass 3 in the tire width direction, and N is not less than 80% and not more than 90% of the distance W between the equatorial plane CP and the outermost section of the carcass 3 in the tire width direction. Specifically, $0.75 \leq L/W \leq 0.85$, $0.85 \leq M/W \leq 0.90$, and $0.80 \leq N/W \leq 0.90$ are preferable. This prevents the diameter growth of the outer edges 6e, in the tire width direction, of the circumferential reinforcing layer 6 and the diameter growth of the outermost main grooves 8E, while ensuring the durability of the pneumatic tire 1.

As described, in the present embodiment, the separation section of the carcass and a belt adjoining the carcass, i.e., the carcass curvature point, is provided near the outer edges, in the tire width direction, of the circumferential reinforcing layer that includes codes forming an angle of 5 degrees or greater and 30 degrees or less with respect to the tire circumferential direction. Consequently, the carcass curvature point having a smaller diameter growth compared with the other parts is provided near the outer edges of the circumferential reinforcing layer in the tire width direction. This makes it possible to prevent the diameter growth of the outer edges, in the tire width direction, of the circumferential reinforcing layer. Accordingly, it is possible to prevent the fatigue of the codes at the outer edges of the circumferential reinforcing layer in the tire width direction.

According to the present embodiment, in the tire width direction, each of the outermost main grooves is provided near the separation section of the carcass and a belt adjoining the carcass. Consequently, the carcass curvature point having a smaller diameter growth compared with the other parts is provided near the outermost main grooves. This prevents the diameter growth of the outermost main grooves. Accordingly, the biased wear is prevented in the shoulder portions of the pneumatic tire, so that the tread can be uniformly worn. The pneumatic tire according to the present embodiment is applicable to pneumatic tires having a large width, i.e., a nominal width of 300 mm or greater, or to pneumatic tires having a low aspect ratio, i.e., a nominal aspect ratio of 70% or less, so as to efficiently prevent the fatigue of codes at outer edges of the circumferential reinforcing layer in the tire width direction, and make uniform wear in the tread.

Evaluation Examples

The following describes evaluation examples of the present invention. Eight types of pneumatic tire prototypes were made whose tire size was 445/50R22.5, and that had modified parameters specifying the position of the carcass curvature point P and the carcass line. Each tire was attached to a 22.5×14.00 rim, and its wire resistance to fatigue and resistance to biased wear were evaluated. Among the prototyped pneumatic tires, seven types are examples of the present invention, and the other one type is a comparative example.

Each of the prototyped pneumatic tires was attached to the rim, and an air pressure of 830 kPa was applied. The prototyped pneumatic tires were then attached to a three-axis trailer. Specifically, six prototyped pneumatic tires were attached to the trailer. The trailer traveled 100,000 kilometers with loads of 45.36 newtons on each of the prototyped pneumatic tires, and then the wire resistance to fatigue and the resistance to biased wear were evaluated. The wire resistance to fatigue was evaluated with the codes constituting the circumferential reinforcing layer 6 shown in FIG. 1, i.e., with the strength retention of the wires. The strength retention of the wires is a ratio of Fa/Fb, where Fa is the strength after the travel and Fb is the strength before the travel. The resistance to biased wear was evaluated with the wear depth in the shoulder portions Sh of the pneumatic tire 1 shown in FIG. 1. The wear depth $\Delta G$ in the shoulder portions Sh is a difference between a wear depth Ge of the outermost main grooves 8E shown in FIG. 1 and a wear depth Gi of the center-portion main groove 8I shown in FIG. 1. Specifically, the relation of $\Delta G = Ge - Gi$ holds.

The wire resistance to fatigue and the resistance to biased wear according to the examples of the present invention are all indicated by normalized index values assuming that the result of the comparative example is 100. Greater index values indicate more excellent wire resistance to fatigue and resistance to biased wear. When the index values are greater than 100, the wire resistance to fatigue and the resistance to biased wear are more excellent than those of the comparative example. The evaluation results are shown in Table 1.

TABLE 1

|  | COMPARATIVE EXAMPLE 1 | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| NOMINAL TIRE HEIGHT (E) [mm] | 222.5 | ← | ← | ← | ← | ← | ← | ← |
| OUTER MAIN GROOVE POSITION (Z) [mm] | 148 | ← | 140 | 155 | 148 | ← | 136 | 150 |
| CARCASS CROSS-SECTION HALF WIDTH (W) [mm] | 213 | ← | ← | ← | ← | ← | ← | ← |

TABLE 1-continued

|  |  | COMPARATIVE EXAMPLE 1 | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|---|
| CARCASS SEPARATION POSITION (Y) [mm] | | 162 | 143 | 136 | 150 | 143 | ← | ← | ← |
| FIRST BELT | HALF WIDTH (L) [mm] | 170 | ← | ← | ← | ← | ← | ← | ← |
| | ANGLE [DEGREE] | 68 | ← | ← | ← | ← | ← | ← | ← |
| SECOND BELT | HALF WIDTH (M) [mm] | 188 | ← | ← | ← | ← | ← | ← | ← |
| | ANGLE [DEGREE] | 17 | ← | ← | ← | ← | ← | ← | ← |
| THIRD BELT | HALF WIDTH (X) [mm] | 143 | ← | ← | ← | ← | ← | ← | ← |
| | ANGLE [DEGREE] | 0 | ← | ← | ← | ← | ← | ← | ← |
| FOURTH BELT | HALF WIDTH (N) [mm] | 175 | ← | ← | ← | ← | ← | ← | ← |
| | ANGLE [DEGREE] | −17 | ← | ← | ← | ← | ← | ← | ← |
| FIFTH BELT | HALF WIDTH [mm] | 158 | ← | ← | ← | ← | ← | ← | ← |
| | ANGLE [DEGREE] | −17 | ← | ← | ← | ← | ← | ← | ← |
| PARAMETERS | X1/W | 0.67 | ← | ← | ← | ← | ← | ← | ← |
| | Y/X2 | 1.13 | 1.00 | 0.95 | 1.05 | 1.00 | ← | ← | ← |
| | A/E | 0.04 | 0.06 | ← | ← | 0.05 | 0.07 | 0.06 | ← |
| | B/E | 0.01 | 0.03 | ← | ← | 0.02 | 0.04 | 0.03 | ← |
| | Z/Y | 0.91 | 1.03 | 1.03 | 1.03 | 1.03 | ← | 0.95 | 1.05 |
| | C/E | 0.03 | 0.03 | ← | ← | ← | ← | ← | ← |
| | D/E | 0.01 | 0.02 | ← | ← | ← | ← | ← | ← |
| | L/W | 0.80 | ← | ← | ← | ← | ← | ← | ← |
| | M/W | 0.88 | ← | ← | ← | ← | ← | ← | ← |
| | N/W | 0.82 | ← | ← | ← | ← | ← | ← | ← |
| WIRE RESISTANCE TO FATIGUE | | 100 | 110 | 110 | 105 | 103 | 110 | 110 | 110 |
| RESISTANCE TO BIASED WEAR (SHOULDER WEAR) | | 100 | 110 | 110 | 110 | 107 | 113 | 105 | 105 |

In Table 1, a first belt is the high-angle belt 4 of the pneumatic tire 1 shown in FIG. 1, a second belt is the first cross belt 5A, a third belt is the circumferential reinforcing layer 6, a fourth belt is the second cross belt 5B, and a fifth belt is the protection belt 7. The angle of codes of each belt is indicated by + (plus) for the circumferential direction of the pneumatic tire, and − (minus) for the opposite direction. In Table 1, outer main groove position Z is the distance Z between the equatorial plane CP and the bottom 8EB of the outermost main grooves 8E, carcass cross-section half width W is the distance W between the equatorial plane CP and the outermost section, in the tire width direction, of the carcass 3, and carcass separation position Y is the distance Y between the equatorial plane CP and the carcass curvature point P.

In the Examples 1 to 7, when internal inflation pressure is 5% of the normal internal pressure Pni for the pneumatic tire 1, the distance Y between the equatorial plane CP and the carcass curvature point P is not less than 95% and not more than 105% of a distance X2 between the equatorial plane CP and the outer edge 6e of the circumferential reinforcing layer 6 in the tire width direction. Specifically, the relation of $0.95 \leq Y/X2 \leq 1.05$ was satisfied. On the contrary, the result of the comparative example is Y/X2=1.13, which falls outside the range of $0.95 \leq Y/X2 \leq 1.05$. As seen from the results shown in Table 1, by satisfying the relation of $0.95 \leq Y/X2 \leq 1.05$, the wire resistance to fatigue and the resistance to biased wear are improved compared with the comparative example. Regarding the improvement in the wire resistance to fatigue, it is found that the durability of the pneumatic tire is also improved by satisfying the relation of $0.95 \leq Y/X2 \leq 1.05$.

In the Examples 1 to 7, when internal inflation pressure is 5% of the normal internal pressure Pni for the pneumatic tire 1, the distance Z between the equatorial plane CP and the bottom 8EB of the outermost main grooves 8E is not less than 95% and not more than 105% of the distance Y between the equatorial plane CP and the carcass curvature point P. Specifically, the relation of $0.95 \leq Z/Y \leq 1.05$ was satisfied. On the contrary, the result of the comparative example is Z/Y=0.91, which falls outside the range of $0.95 \leq Z/Y \leq 1.05$.

As seen from the results shown in Table 1, by satisfying the relation of $0.95 \leq Z/Y \leq 1.05$, the wire resistance to fatigue and the resistance to biased wear are improved compared with the comparative example. Regarding the improvement in the wire resistance to fatigue, it is found that the durability of the pneumatic tire is also improved by satisfying the relation of $0.95 \leq Z/Y \leq 1.05$.

In the Examples 1 to 7, the difference A between the Pd and the Qd is not less than 5% and not more than 7% of the nominal tire height E. Specifically, the relation of $0.05 \leq A/E \leq 0.07$ was satisfied. Further, the difference B between the Pd and the Sd is not less than 2% and not more than 4% of the nominal tire height E. Specifically, the relation of $0.02 \leq B/E \leq 0.04$ was satisfied. On the contrary, the results of the comparative example are A/E=0.04 and B/E=0.01, which fall outside the ranges of $0.05 \leq A/E \leq 0.07$ and $0.02 \leq B/E \leq 0.04$.

As seen from the results shown in Table 1, by satisfying the relations of $0.05 \leq A/E \leq 0.07$ and $0.02 \leq B/E \leq 0.04$, the wire resistance to fatigue and the resistance to biased wear are improved compared with the comparative example. Further, from the results shown in Table 1, by making A and B greater within the above ranges, the diameter growth of the outermost main grooves 8E are efficiently prevented, so that the biased wear is efficiently prevented in the shoulder portions Sh of the pneumatic tire 1.

In the first to the seventh examples, the perpendicular distance D from the midpoint R to the carcass 3 is not less than 1.3% and not more than 2.3% of the nominal tire height E. Specifically, the relation of $0.013 \leq D/E \leq 0.023$ was satisfied. On the contrary, the result of the comparative example is A/E $\leq 0.01$, which falls outside the range of $0.013 \leq A/E \leq 0.023$. As seen from the results shown in Table 1, by satisfying the relation of $0.013 \leq D/E \leq 0.023$, the wire resistance to fatigue and the resistance to biased wear are improved compared with the comparative example.

INDUSTRIAL APPLICABILITY

As described, a pneumatic tire according to the present invention is useful for a pneumatic tire including a circumferential reinforcing layer, and is particularly suitable for a pneumatic tire having a large width and a low aspect ratio.

The invention claimed is:

1. A pneumatic tire comprising:
at least two cross belts that have codes forming an angle of 5 degrees or greater and 30 degrees or less with respect to a tire circumferential direction;
a circumferential reinforcing layer that has a width smaller than smallest width of the cross belts, and that has codes forming an angle of 0 degrees or greater and 5 degrees or less with respect to the tire circumferential direction; a carcass located inside, in a tire diameter direction, relative to a cross belt being inside among the cross belts in the tire diameter direction; and
a high-angle belt which is provided on an outer side of the carcass in the tire diameter direction, wherein
outer edges of the high-angle belt extend further outwardly than outer edges of the circumferential reinforcing layer but further inwardly than outer edges of the cross belts in the width direction of the tire, and such that the outer edges of the high-angle belt are disposed offset in the width direction of the tire with respect to outer edges of the cross belts,
at 100% internal inflation pressure, a distance X1 between an equatorial plane of the pneumatic tire and an outer edge, in a tire width direction, of the circumferential reinforcing layer is not less than 60% and not more than 75% of a distance W between the equatorial plane and an outermost section of the carcass in the tire width direction, and
at 5% internal inflation pressure, a distance Y between the equatorial plane and a separation section of the carcass and a belt outwardly adjoining the carcass in the tire diameter direction is not less than 95% and not more than 105% of a distance X2 between the equatorial plane and the outer edge, in the tire width direction, of the circumferential reinforcing layer.

2. The pneumatic tire according to claim 1, wherein, at 5% internal inflation pressure, a distance Z between the equatorial plane and a bottom of a circumferential groove provided in an outermost portion of the pneumatic tire in the tire width direction is not less than 95% and not more than 105% of the distance Y between the equatorial plane and the separation section.

3. The pneumatic tire according to claim 1, wherein
when Qd is a distance between a rotation axis of the pneumatic tire and a position Q at which a perpendicular line extending from an outer edge, in the tire width direction, of the cross belt being inside in the tire diameter direction intersects the carcass, and when Pd is a distance between the separation section and the rotation axis, a difference between Pd and Qd is not less than 5% and not more than 7% of a product E of a nominal width of the pneumatic tire and a nominal aspect ratio of the pneumatic tire, and
when Sd is a distance between the rotation axis of the pneumatic tire and a position S at which a perpendicular line extending from a midpoint R intersects the carcass, the midpoint R being on the cross belt being inside in the tire diameter direction and between the separation section and the outer edge, in the tire width direction, of the cross belt being inside in the tire diameter direction, a difference between Pd and Sd is not less than 2% and not more than 4% of the product E of the nominal width of the pneumatic tire and the nominal aspect ratio of the pneumatic tire.

4. The pneumatic tire according to claim 1, wherein,
in a cross section of the pneumatic tire taken along a meridional plane passing the rotation axis, at 5% internal inflation pressure, a perpendicular distance C from an outer edge, in the tire width direction, of the cross belt being inside in the tire diameter direction to the carcass is not less than 3% and not more than 4.5% of the product E of the nominal width of the pneumatic tire and the nominal aspect ratio of the pneumatic tire, and
a perpendicular distance D from a midpoint R to the carcass is not less than 1.3% and not more than 2.3% of the product E of the nominal width of the pneumatic tire and the nominal aspect ratio of the pneumatic tire, the midpoint being on the cross belt being inside in the tire diameter direction and between the separation section and the outer edge, in the tire width direction, of the cross belt being inside in the tire diameter direction.

5. The pneumatic tire according to claim 1, wherein the high-angle belt has codes that form an angle of 45 degrees or greater and 90 degrees or less with respect to the tire circumferential direction.

6. The pneumatic tire according to claim 5, wherein
at 100% internal inflation pressure, a distance L between the equatorial plane and an outer edge, in the tire width direction, of the high-angle belt is not less than 75% and not more than 85% of the distance W between the equatorial plane and the outermost section of the carcass in the tire width direction,
a distance M between the equatorial plane and an outer edge, in the tire width direction, of the cross belt being inside in the tire diameter direction is not less than 85% and not more than 95% of the distance W between the equatorial plane and the outermost section of the carcass in the tire width direction, and
a distance N between the equatorial plane and an outer edge, in the tire width direction, of a cross belt being outside among the cross belts in the tire diameter direction is not less than 80% and not more than 90% of the distance W between the equatorial plane and the outermost section of the carcass in the tire width direction.

7. The pneumatic tire according to claim 1, wherein the nominal width of the pneumatic tire is equal to or greater than 300 mm.

8. The pneumatic tire according to claim 1, wherein the nominal aspect ratio of the pneumatic tire is equal to or less than 70%.

* * * * *